(12) United States Patent
Kawamitsu (10) Patent No.: US 11,081,129 B2
(45) Date of Patent: Aug. 3, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Yuki Kawamitsu, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/567,935

(22) Filed: Sep. 11, 2019

(65) Prior Publication Data

US 2020/0302955 A1 Sep. 24, 2020

(30) Foreign Application Priority Data

Mar. 19, 2019 (JP) .............................. JP2019-051325

(51) Int. Cl.
*G11B 5/012* (2006.01)
(52) U.S. Cl.
CPC ...... *G11B 5/012* (2013.01); *G11B 2220/2508* (2013.01)
(58) Field of Classification Search
None
See application file for complete search history.

(56) References Cited

U.S. PATENT DOCUMENTS

| 5,495,372 | A | * | 2/1996 | Bahlmann | ................. | H02P 6/34 360/75 |
| 5,969,899 | A | * | 10/1999 | Utenick | ................... | G11B 5/54 360/75 |
| 6,603,640 | B1 | | 8/2003 | Prater et al. | | |
| 8,407,505 | B2 | | 3/2013 | Asaba | | |
| 9,891,689 | B2 | | 2/2018 | Kohara | | |
| 9,911,442 | B1 | | 3/2018 | Kharisov et al. | | |
| 2001/0024339 | A1 | * | 9/2001 | Yaegashi | .............. | G11B 5/5521 360/75 |
| 2002/0021513 | A1 | * | 2/2002 | Kaneko | .................. | G11B 21/22 360/6 |
| 2005/0264914 | A1 | * | 12/2005 | Kusumoto | ............... | G11B 5/54 360/75 |

(Continued)

FOREIGN PATENT DOCUMENTS

| CN | 104571459 A | 4/2015 |
| CN | 106293503 A | 1/2017 |

(Continued)

*Primary Examiner* — Peter Vincent Agustin
(74) *Attorney, Agent, or Firm* — White & Case LLP (57) ABSTRACT

According to one embodiment, a magnetic disk includes a disk, first and second heads which write data to the disk and read data from the disk, a first actuator includes the first head, a second actuator includes the second head, first and second controllers which control the first head, the second head, the first actuator and the second actuator, an auxiliary power supply which supplies power when power from a power supply is shut off, and a power supply detection unit which makes power supplied from the auxiliary power supply to the first controller higher than the power supplied from the auxiliary power supply to the second controller when shutoff of power from the power supply is detected.

11 Claims, 11 Drawing Sheets

(56) References Cited

U.S. PATENT DOCUMENTS

| | | | |
|---|---|---|---|
| 2010/0302664 A1* | 12/2010 | Heo | G11B 19/047 |
| | | | 360/31 |
| 2015/0106644 A1 | 4/2015 | Lin et al. | |
| 2016/0378385 A1 | 12/2016 | Kawakami et al. | |
| 2020/0082846 A1* | 3/2020 | Sakamoto | G06F 1/30 |

FOREIGN PATENT DOCUMENTS

| | | |
|---|---|---|
| JP | 5229326 B2 | 7/2013 |
| JP | 2016-119003 A | 6/2016 |

\* cited by examiner

MAGNETIC DISK DEVICE

CROSS-REFERENCE TO RELATED APPLICATIONS

This application is based upon and claims the benefit of priority from Japanese Patent Application No. 2019-051325, filed Mar. 19, 2019, the entire contents of which are incorporated herein by reference.

FIELD

Embodiments described herein relate generally to a magnetic disk device.

BACKGROUND

Recently, the number of magnetic disks has increased in connection with the increase in the recording capacity of magnetic disk devices. To deal with the increase in the number of magnetic disks, a multiactuator magnetic disk device, which comprises a plurality of, for example, two actuators, is suggested. Multiactuator magnetic disk devices each comprise a plurality of controllers to independently control a plurality of actuators. Therefore, multiactuator magnetic disk devices may consume more electricity than normal magnetic disk devices which each comprise a single actuator. In multiactuator magnetic disk devices, when power from a power supply is shut off or reduced, a power loss protection (PLP) process may be interrupted by a steep drop in voltage.

DETAILED DESCRIPTION

In general, according to one embodiment, a magnetic disk device comprises: a disk; first and second heads which write data to the disk and read data from the disk; a first actuator comprising the first head; a second actuator comprising the second head; first and second controllers which control the first head, the second head, the first actuator and the second actuator; an auxiliary power supply which supplies power when power from a power supply is shut off; and a power supply detection unit which makes power supplied from the auxiliary power supply to the first controller higher than the power supplied from the auxiliary power supply to the second controller when shutoff of power from the power supply is detected.

Embodiments will be described hereinafter with reference to the accompanying drawings. The drawings are merely examples and do not limit the scope of the invention.

First Embodiment

Figure 1:
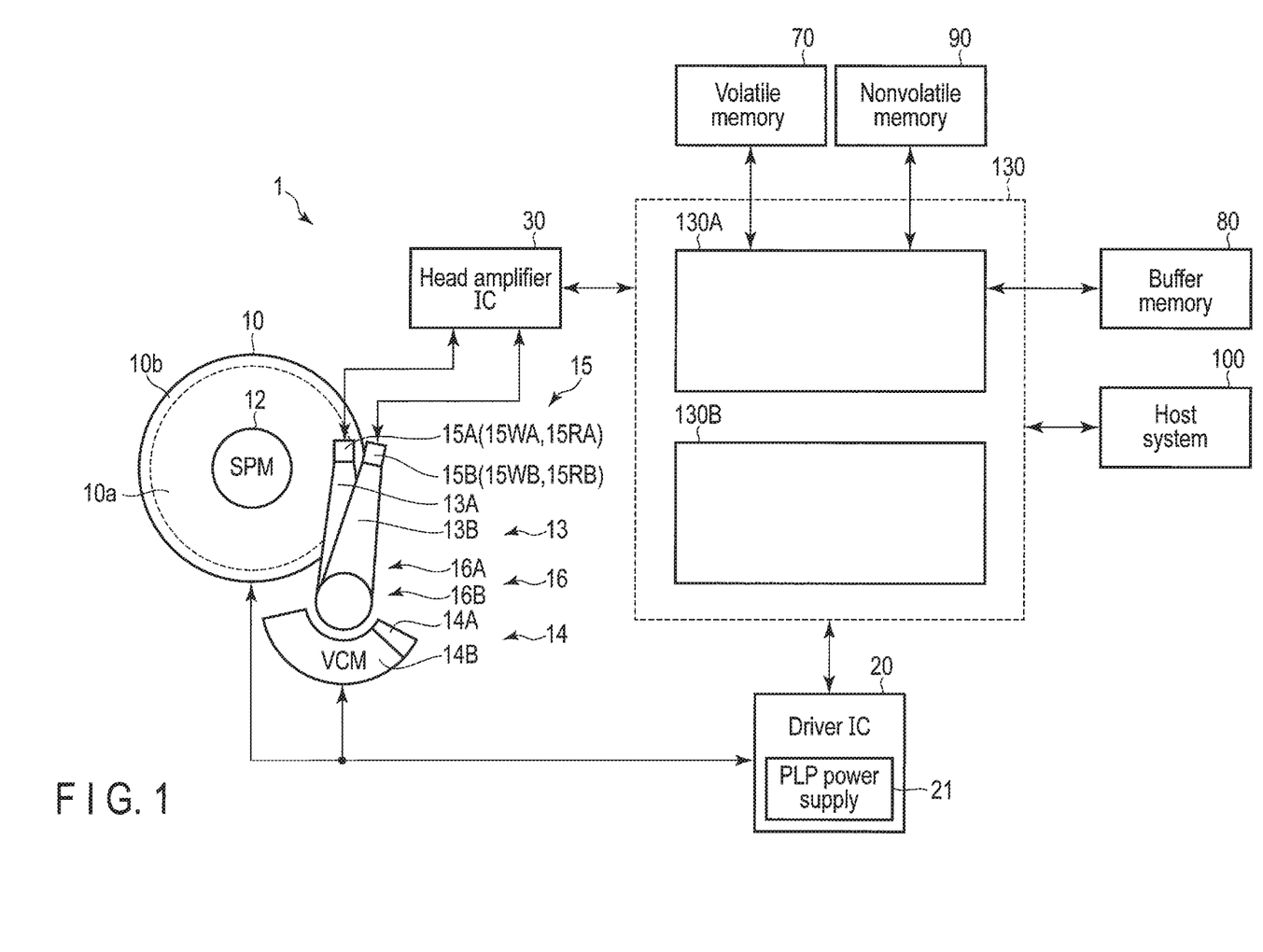
FIG. 1 is a block diagram showing the structure of a magnetic disk device according to a first embodiment.

FIG. 1 is a block diagram showing the structure of a magnetic disk device 1 according to a first embodiment.

The magnetic disk device 1 comprises a head-disk assembly (HDA) as described later, a driver integrated circuit (IC) 20, a head amplifier integrated circuit (a head amplifier IC or a preamplifier) 30, a volatile memory 70, a buffer memory (buffer) 80, a nonvolatile memory 90 and a system controller 130 which is a single-chip integrated circuit. The magnetic disk device 1 is connected to a host system (simply, a host) 100. The magnetic disk device 1 is a multiactuator magnetic disk device comprising a plurality of, for example, two actuators 16 as described later. The magnetic disk device 1 may comprise more than two actuators 16. The magnetic disk device 1 may be a normal disk device comprising a single actuator 16.

The HDA comprises a magnetic disk (disk) 10, a spindle motor (SPM) 12, an arm 13 comprising a head 15, and a voice coil motor (VCM) 14. The disk 10 is attached to the spindle motor 12, and rotates when the spindle motor 12 is driven. The arm 13 comprises, for example, arms 13A and 13B. The VCM 14 comprises, for example, VCMs 14A and 14B. The head 15 comprises, for example, heads 15A and 15B. An actuator 16A comprises the arm 13A and the VCM 14A. An actuator 16B comprises the arm 13B and the VCM 14B. The actuator 16A drives the VCM 14A to move the head 15A mounted on the arm 13A to the target position on the disk 10. The actuator 16B drives the VCM 14B to move the head 15B mounted on the arm 13B to the target position on the disk 10. The actuators 16A and 16B are attached to the common pivot shaft, and are configured to independently rotate around the pivot shaft from each other. Two or more disks 10 may be provided. Each of the heads 15A and 15B may comprise two or more heads. Three or more arms 13, VCMs 14 and heads 15 may be provided.

A user data area 10a available to the user and a system area 10b to which information necessary for system management is written are allocated to an area of the disk 10 to which data can be written. A direction perpendicular to the radial direction of the disk 10 is referred to as a circumferential direction.

The head 15A comprises a slider as the main body, and further comprises a write head 15WA and a read head 15RA mounted on the slider. The head 15B comprises a slider as the main body, and further comprises a write head 15WB and a read head 15RB mounted on the slider. The write heads 15WA and 15WB write data to the disk 10. The read heads 15RA and 15RB read the data stored in the data tracks of the disk 10.

The driver IC 20 controls the drive of the SPM 12 and the VCM 14 in accordance with the control of the system controller 130 (in detail, an MPU 60 as described later). The driver IC 20 comprises a PLP power supply (auxiliary power supply) 21 as a backup power supply. When power from the power supply of the magnetic disk device 1 (simply, a power supply) is shut off, or when power from the power supply is reduced, the PLP power supply 21 supplies power necessary to maintain the minimum operation of the magnetic disk device 1.

The head amplifier IC (preamplifier) 30 comprises a read amplifier and a write driver. The read amplifier amplifies the read signal read from the disk 10 and outputs the read signal to the system controller 130 (in detail, a read/write [R/W] channel 40 as described later). The write driver outputs write current to the head 15 in accordance with the signal output from the R/W channel 40.

The volatile memory 70 is a semiconductor memory in which data is lost when power supply is shut off. The volatile memory 70 stores data necessary for the processes of the units of the magnetic disk device 1, etc. The volatile memory 70 is, for example, a dynamic random access memory (DRAM) or a synchronous dynamic random access memory (SDRAM).

The buffer memory 80 is a semiconductor memory in which, for example, the data transferred between the magnetic disk device 1 and the host 100 is temporarily stored. The buffer memory 80 may be integrally structured with the volatile memory 70. The buffer memory 80 is, for example, a DRAM, a static random access memory (SRAM), an SDRAM, a ferroelectric random access memory (FeRAM) or a magnetoresistive random access memory (MRAM).

The nonvolatile memory 90 is a semiconductor memory in which the stored data is maintained even when power supply is shut off. The nonvolatile memory 90 is, for example, a NOR or NAND flash read only memory (flash ROM or FROM).

The system controller (controller) 130 is realized by, for example, using a large-scale integrated circuit (LSI) called a System-on-a-Chip (SoC), in which a plurality of elements are integrated in a single chip. The system controller 130 is electrically connected to the driver IC 20, the head amplifier IC 30, the volatile memory 70, the buffer memory 80, the nonvolatile memory 90 and the host system 100. The system controller 130 comprises, for example, system controllers 130A and 130B. In the example shown in FIG. 1, the system controller 130A is electrically connected to the volatile memory 70, the buffer memory (buffer) 80 and the nonvolatile memory 90.

Figure 2:
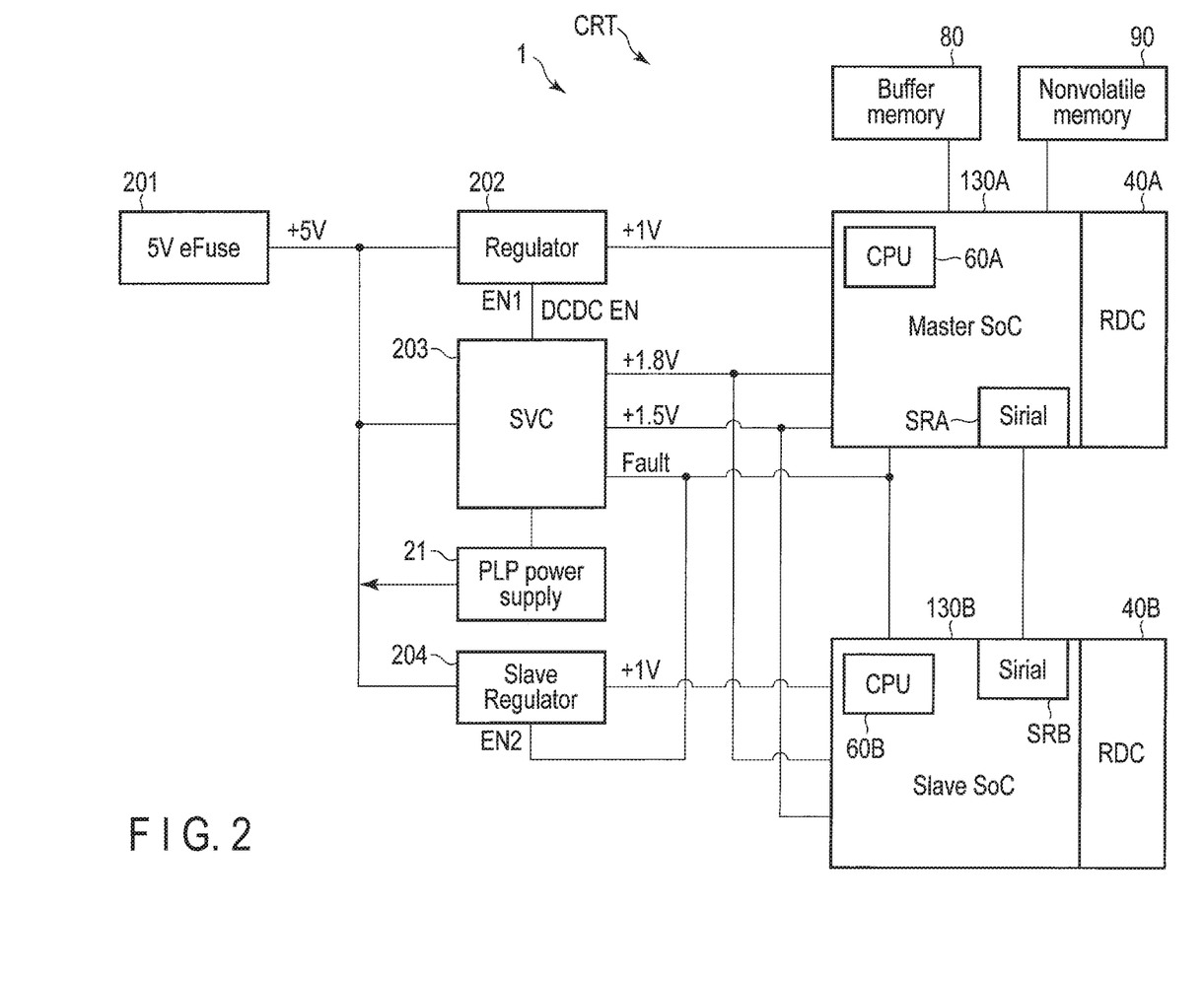
FIG. 2 is a block diagram showing an example of a PLP circuit according to the first embodiment.

FIG. 2 is a block diagram showing an example of a PLP circuit CRT according to the present embodiment.

The PLP circuit CRT is a circuit for performing a PLP process. The PLP circuit CRT comprises, for example, the PLP power supply 21, the buffer memory 80, the nonvolatile memory 90, the system controllers 130A and 130B, a power supply 201, a regulator 202, a servo component (SVC) 203 and a regulator (slave regulator) 204. Hereinafter, the regulator 202 may be referred to as a power supply unit 202. The SVC 203 may be referred to as a power supply detection unit 203. The regulator 204 may be referred to as a power supply unit 204. The PLP circuit CRT may further comprise the volatile memory 70.

The power supply 201 is, for example, a 5 V eFuse. The power supply 201 is electrically connected to the regulator 202, the SVC 203 and the regulator 204. The power supply 201 supplies electricity (power) to the regulator 202, the SVC 203 and the regulator 204. For example, the power supply 201 supplies a power of 5 V to each of the regulator 202, the SVC 203 and the regulator 204.

The regulator 202 comprises a DCDC enable pin EN1. The regulator 202 is equivalent to, for example, a master regulator with respect to the regulator 204. The regulator 202 is electrically connected to the system controller 130A. The regulator 202 outputs a particular voltage or current, for example, a fixed voltage, to the system controller 130A. For example, the regulator 202 outputs a voltage of 1 V to the system controller 130A.

The SVC 203 is electrically connected to the PLP power supply 21, the power supply 201, the DCDC enable pin EN1 of the regulator 202, the system controller 130A, the system controller 130B and the enable pin EN2 of the regulator 204. For example, the SVC 203 outputs 1.8 V and 1.5 V to each of the system controllers 130A and 130B. When the shutoff of or reduction in power from the power supply 201 is detected, the SVC 203 reduces at least the power supplied to the system controller 130B. In other words, when the shutoff of or reduction in power from the power supply 201 is detected, the SVC 203 makes the power supply amount to the system controller 130A higher than the power supply amount to the system controller 130B. The operation of "making the power supply amount to the system controller 130A higher than the power supply amount to the system controller 130B" includes making the power supply amount to the system controller 130B to be zero without changing the power supply amount to the system controller 130B. When the shutoff of or reduction in power from the power supply 201 is detected, for example, the SVC 203 outputs a fault signal to the regulator 204 and the system controllers 130A and 130B. When the shutoff of or reduction in power from the power supply 201 is detected, the SVC 203 outputs a signal to activate the PLP power supply 21 (hereinafter referred to as activation signal) to the PLP power supply 21.

The regulator 204 comprises the enable pin EN2. The regulator 204 is equivalent to a slave regulator with respect to the regulator 202. The regulator 204 is electrically connected to the system controller 130B. The regulator 204 outputs a particular voltage or current, for example, a fixed voltage, to the system controller 130B. For example, the regulator 204 outputs a voltage of 1 V to the system controller 130B. When the regulator 204 receives a fault signal in the enable pin EN2 from the SVC 203, the operation of the regulator 204 is stopped (in other words, the regulator 204 is disabled).

The PLP power supply 21 is structured by counter electromotive force supplied from the spindle motor 12 shown in FIG. 1, the retention charge of a capacitor (not shown), etc. The PLP power supply 21 is electrically connected to the regulator 202, the SVC 203 and the regulator 204. When an activation signal is received from the SVC 203, the PLP power supply 21 is activated and supplies power to at least the regulator 202. For example, when an activation signal is received from the SVC 203, the PLP power supply 21 is activated to makes the power supply amount to the regulator 202 higher than the regulator 204. The operation of "making the power supply amount to the regulator 202 higher than the regulator 204" includes making the power supply amount to the regulator 204 to be zero without changing the power supply amount to the regulator 204.

The buffer memory 80 is connected to the system controller 130A. The buffer memory 80 temporarily stores cache data, for example, of the write data to be written to the disk 10 by an instruction from the host 100, data which is not written to the disk 10. The buffer memory 80 may be included in the volatile memory 70. In place of the buffer memory 80, the volatile memory 70 may be connected to the system controller 130A.

The nonvolatile memory 90 is connected to the system controller 130A. When the shutoff of or reduction in power from the power supply 201 is detected, the nonvolatile memory 90 stores the cache data stored in the buffer memory 80.

The system controller 130A is equivalent to, for example, a master SoC with respect to the system controller 130B. The system controller 130A comprises an R/W channel 40A, a central processing unit (CPU) 60A and a serial interface SRA. The system controller 130A is electrically connected to the buffer memory 80 and the nonvolatile memory 90. The system controller 130A is connected to the serial interface SRB of the system controller 130B as described later via the serial interface SRA. When the shutoff of or reduction in power from the power supply 201 is detected, for example, when a fault signal is received from the SVC 203, the system controller 130A performs a backup process for saving the cache data stored in the buffer memory to the nonvolatile memory 90.

The R/W channel 40A performs a signal process of read data transferred from the disk 10 to the host 100 and write data transferred from the host 100 in response to an instruction from the MPU 60A as described later. The R/W channel 40A comprises a circuit or function for evaluating the signal quality of read data.

The CPU 60A is a main controller which controls the units of the magnetic disk device 1 in response to an instruction from the host 100, etc. For example, the CPU 60A performs servo control by controlling the actuator 16A via the driver IC 20 to determine the position of the head 15A. For example, the CPU 60A may perform servo control by controlling the actuator 16B via the driver IC 20 to determine the position of the head 15B. The CPU 60A controls data write to the disk 10 and selects the storage destination of write data. The CPU 60A controls data read from the disk 10 and controls the process of read data. The CPU 60A is connected to the units of the magnetic disk device 1. The CPU 60A is electrically connected to, for example, the driver IC 20 and the R/W channel 40A.

The serial interface SRA is a high-speed serial interface, which enables high-speed serial communication.

The system controller 130B is equivalent to, for example, a slave SoC with respect to the system controller 130A. The system controller 130B comprises an R/W channel 40B, a CPU 60B and the serial interface SRB. When the operation of the regulator 204 is stopped (in other words, when the regulator 204 is disabled), the operation of the system controller 130B is stopped (off) as the power supplied from the regulator 204 is shut off.

The R/W channel 40B performs a signal process of read data transferred from the disk 10 to the host 100 and write data transferred from the host 100 in response to an instruction from the CPU 60B as described later. The R/W channel 40B comprises a circuit or function for evaluating the signal quality of read data.

The CPU 60B is a main controller which controls the units of the magnetic disk device 1 in response to an instruction from the host 100, etc. For example, the CPU 60B performs servo control by controlling the actuator 16B via the driver IC 20 to determine the position of the head 15B. For example, the CPU 60B may perform servo control by controlling the actuator 16A via the driver IC 20 to determine the position of the head 15A. The CPU 60B controls data write to the disk 10 and selects the storage destination of write data. The CPU 60B controls data read from the disk 10 and controls the process of read data. The CPU 60B is connected to the units of the magnetic disk device 1. The CPU 60B is electrically connected to, for example, the driver IC 20 and the R/W channel 40B.

The serial interface SRB comprises a structure similar to that of the serial interface SRA.

Figure 3:
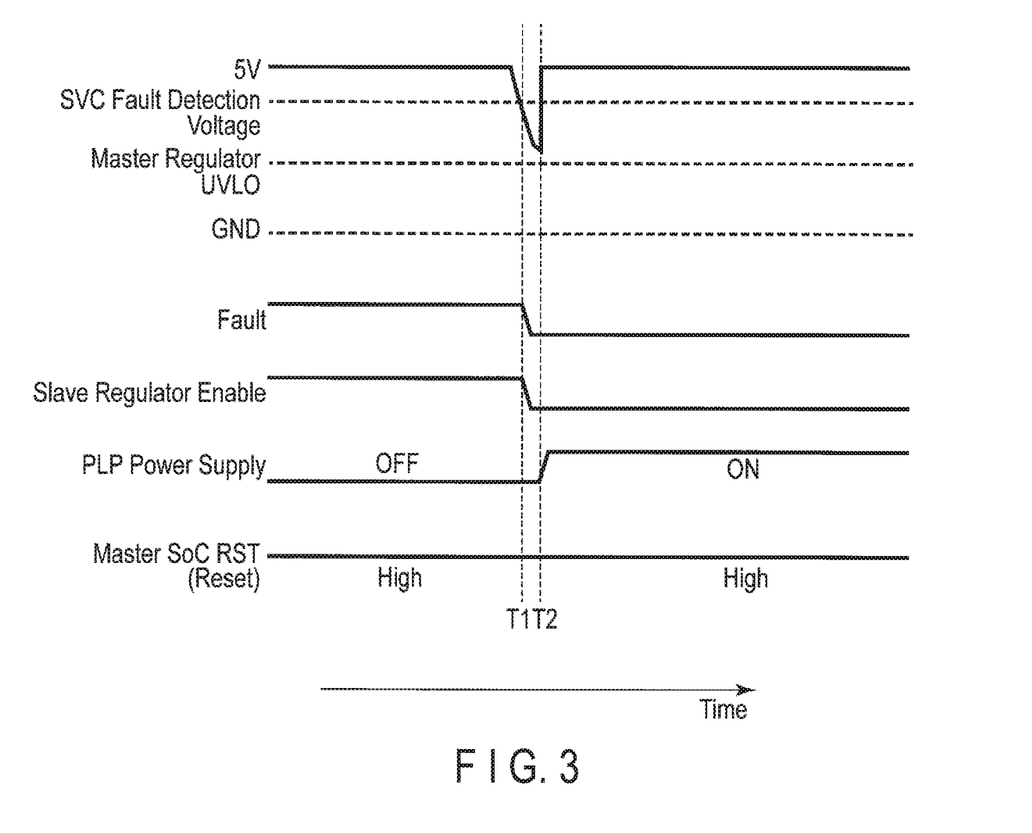
FIG. 3 is a timing chart showing an example of the PLP process of the PLP circuit shown in FIG. 2.

FIG. 3 is a timing chart showing an example of the PLP process of the PLP circuit CRT shown in FIG. 2. In FIG. 3, the horizontal axis represents time. In FIG. 3, the arrow shows the passage of time. The horizontal axis of FIG. 3 indicates that the SVC detects the shutoff of or reduction in a power of 5 V (electricity) supplied from the power supply 201, in other words, timing T1 at which a fault signal output from the SVC 203 is detected, and timing T2 at which the PLP power supply 21 is activated. FIG. 3 shows the power from the power supply 201 (5 V), the voltage when the SVC 203 detects the shutoff of or reduction in power from the power supply 201 or the voltage when a fault signal output from the SVC is detected (SVC Fault Detection Voltage), the voltage at which the low-voltage abnormal operation prevention function (Under Voltage Lock Out [UVLO]) of the regulator 202 operates (Master Regulator UVLO), ground voltage (GND), a fault signal (Fault), the enable of the regulator 204 (Slave Regulator Enable), the PLP power supply 21 (PLP Power Supply) and the reset of the system controller 130A (Master SoC Reset).

In the examples shown in FIG. 2 and FIG. 3, when the shutoff of or reduction in power from the power supply 201 is detected at timing T1, the SVC 203 outputs a fault signal to the system controller 130A, the system controller 130B and the enable pin EN2 of the regulator 204. When a fault signal is received from the SVC 203 at timing T1, the operation of the regulator 204 is stopped. As power is not supplied from the regulator 204, the operation of the system controller 130B is stopped. When the shutoff of or reduction in power from the power supply 201 is detected at timing T1, the SVC 203 outputs an activation signal to the PLP power supply. When an activation signal is received from the SVC 203, the PLP power supply 21 is activated at timing T2. The PLP power supply 21 supplies power to the regulator 202 to maintain the operation of the system controller 130A. It is possible to prevent the interruption of a PLP process by activating the PLP power supply 21 at timing T2 before the voltage of the regulator 202 reaches the master regulator UVLO. In this way, before the UVLO of the regulator 202 operates, the PLP power supply 21 is activated, and further, the system controller 130B is stopped. Thus, the system controller 130A is configured to perform a backup process for storing, in the nonvolatile memory 90, the cache data temporarily stored in the buffer memory 80 without interrupting a PLP process.

In the present embodiment, the magnetic disk device 1 comprises the arm 13A comprising the head 15A, the arm 13B comprising the head 15B, the VCM 14A, the VCM 14B, the power supply 201, the regulator 202, the SVC 203, the regulator 204, the PLP power supply 21, the buffer memory 80, the nonvolatile memory 90, the system controller 130A and the system controller 130B. The power supply 201 is electrically connected to the regulator 202, the regulator 204 and the SVC 203. The regulator 202 is electrically connected to the system controller 130A. The regulator 204 is electrically connected to the system controller 130B. The SVC 203 is electrically connected to the enable pin EN1 of the regulator 202. The SVC 203 is electrically connected to the enable pin EN2 of the regulator 204. The SVC 203 is electrically connected to the PLP power supply 21. The SVC 203 is electrically connected to the system controllers 130A and 130B. When the shutoff of or reduction in power from the power supply is detected, the magnetic disk device 1 outputs a fault signal to the enable pin EN2 of the regulator 204 and disables (stops) the regulator 204. When the regulator 204 is stopped, the operation of the system controller 130B is stopped. When the shutoff of or reduction in power from the power supply 201 is detected, the magnetic disk device 1 immediately reduces power consumption by shutting off the power supply to the system controller 130B and activates PLP power supply. Thus, a PLP process can be performed by only the power consumption of the system controller 130A. In this way, when the power from the power supply 201 is shut off or reduced, power can be supplied to the regulator 202 before the voltage of the regulator 202 reaches the voltage at which the UVLO operates. This structure prevents the interruption of a PLP process. The reliability of the magnetic disk device 1 can be improved.

Now, this specification explains a magnetic disk device according to other embodiments and modification examples. In the other embodiments and the modification examples, same portions as the above embodiment are denoted by like reference numbers, detailed description thereof being omitted.

Second Embodiment

The magnetic disk device 1 of the second embodiment is different from the magnetic disk device 1 of the first embodiment in terms of the structure of a PLP circuit CRT.

Figure 4:
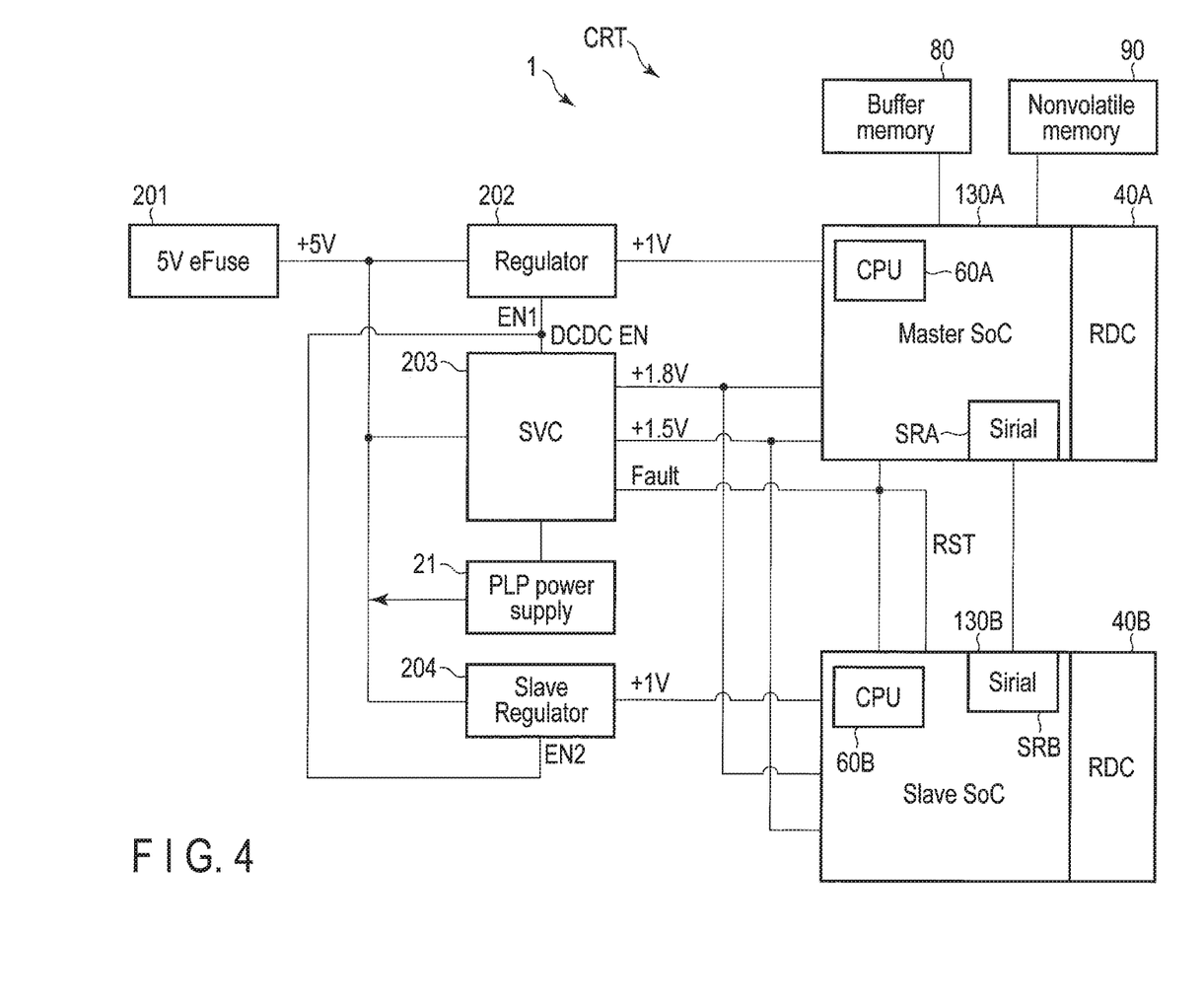
FIG. 4 is a block diagram showing an example of a PLP circuit according to a second embodiment.

FIG. 4 is a block diagram showing an example of the PLP circuit CRT according to the second embodiment.

An SVC 203 is electrically connected to a PLP power supply 21, a power supply 201, the DCDC enable pin EN1 of a regulator 202, a regulator 204, a system controller 130A, a system controller 130B and a reset pin RST provided in the system controller 130B as described below. The SVC 203 is connected to the reset pin RST of the system controller 130B as described below. When the shutoff of or reduction in power from the power supply 201 is detected, the SVC 203 outputs a fault signal to the reset pin RST of the system controller 130B.

The system controller 130B comprises an R/W channel 40B, a CPU 60B, a serial interface SRB and the reset pin RST. When a fault signal is input to the reset pin RST from the SVC 203, the operation of the system controller 130B is stopped (in other words, the system controller 130B is off or reset).

Figure 5:
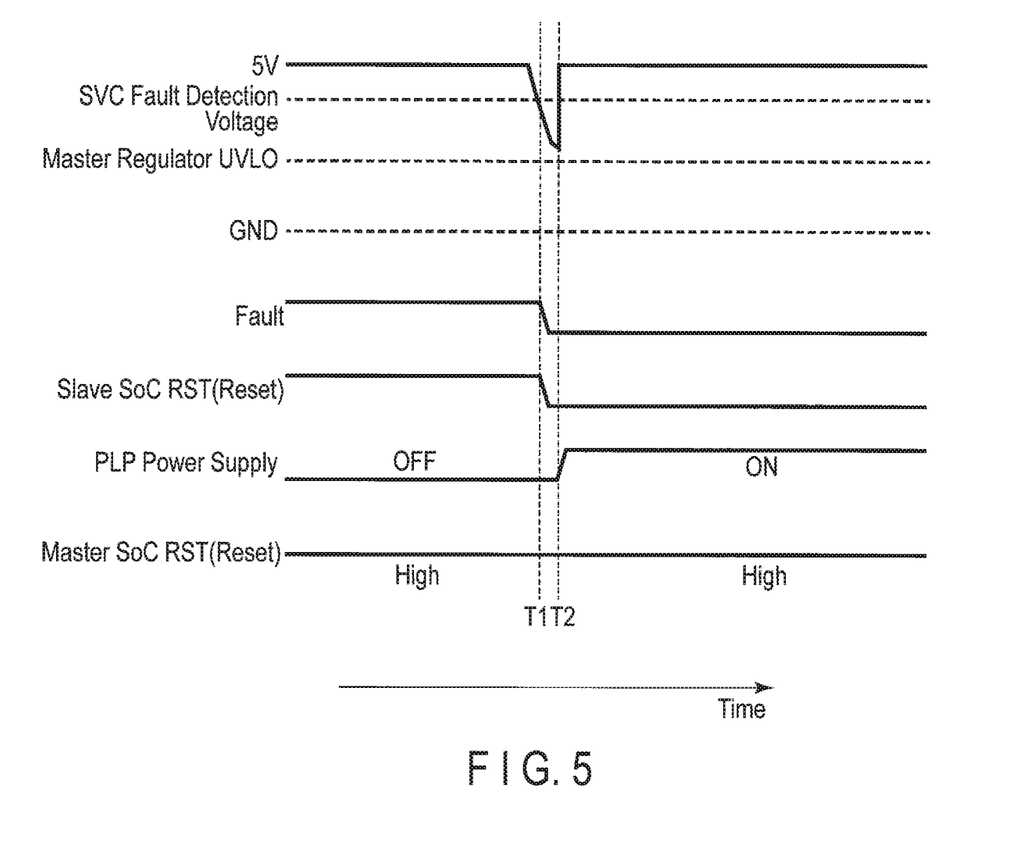
FIG. 5 is a timing chart showing an example of the PLP process of the PLP circuit shown in FIG. 4.

FIG. 5 is a timing chart showing an example of the PLP process of the PLP circuit CRT shown in FIG. 4. In FIG. 5, the horizontal axis represents time. In FIG. 5, the arrow shows the passage of time. FIG. 5 shows the reset of the system controller 130B (Slave SoC Reset).

In the examples shown in FIG. 4 and FIG. 5, when the shutoff of or reduction in power from the power supply 201 is detected at timing T1, the SVC 203 outputs a fault signal to the system controller 130A, the system controller 130B and the reset pin RST of the system controller 130B. When the shutoff of or reduction in power from the power supply 201 is detected at timing T1, the SVC 203 outputs a regulator enable signal to the regulator 204. When a fault signal is received from the SVC 203 in the reset pin RST at timing T1, the operation of the system controller 130B is stopped. When the shutoff of or reduction in power from the power supply 201 is detected at timing T1, the SVC 203 outputs an activation signal to the PLP power supply. When an activation signal is received from the SVC 203, the PLP power supply 21 is activated at timing T2. The PLP power supply 21 supplies power to the regulator 202 to maintain the operation of the system controller 130A. It is possible to prevent the interruption of a PLP process by activating the PLP power supply 21 at timing T2 before the voltage of the regulator 202 reaches the master regulator UVLO. In this way, before the UVLO of the regulator 202 operates, the PLP power supply 21 is activated, and further, the system controller 130B is stopped. Thus, the system controller 130A is configured to perform a backup process for storing, in a nonvolatile memory 90, the cache data temporarily stored in a buffer memory 80 without interrupting a PLP process.

According to the second embodiment, when the shutoff of or reduction in power from the power supply is detected, the magnetic disk device 1 outputs a fault signal to the reset pin RST of the system controller 130B and stops the operation of the system controller 130B. When the shutoff of or reduction in power from the power supply 201 is detected, the magnetic disk device 1 immediately reduces power consumption by stopping the operation of the system controller 130B and activates the PLP power supply. Thus, a PLP process can be performed by only the power consumption of the system controller 130A. In this way, when the power from the power supply 201 is shut off or reduced, power can be supplied to the regulator 202 before the voltage of the regulator 202 reaches the voltage at which the UVLO operates. This structure prevents the interruption of a PLP process. The reliability of the magnetic disk device 1 can be improved.

Third Embodiment

The magnetic disk device 1 of the third embodiment is different from the magnetic disk device 1 of each of the above embodiments in terms of the structure of a PLP circuit CRT.

Figure 6:
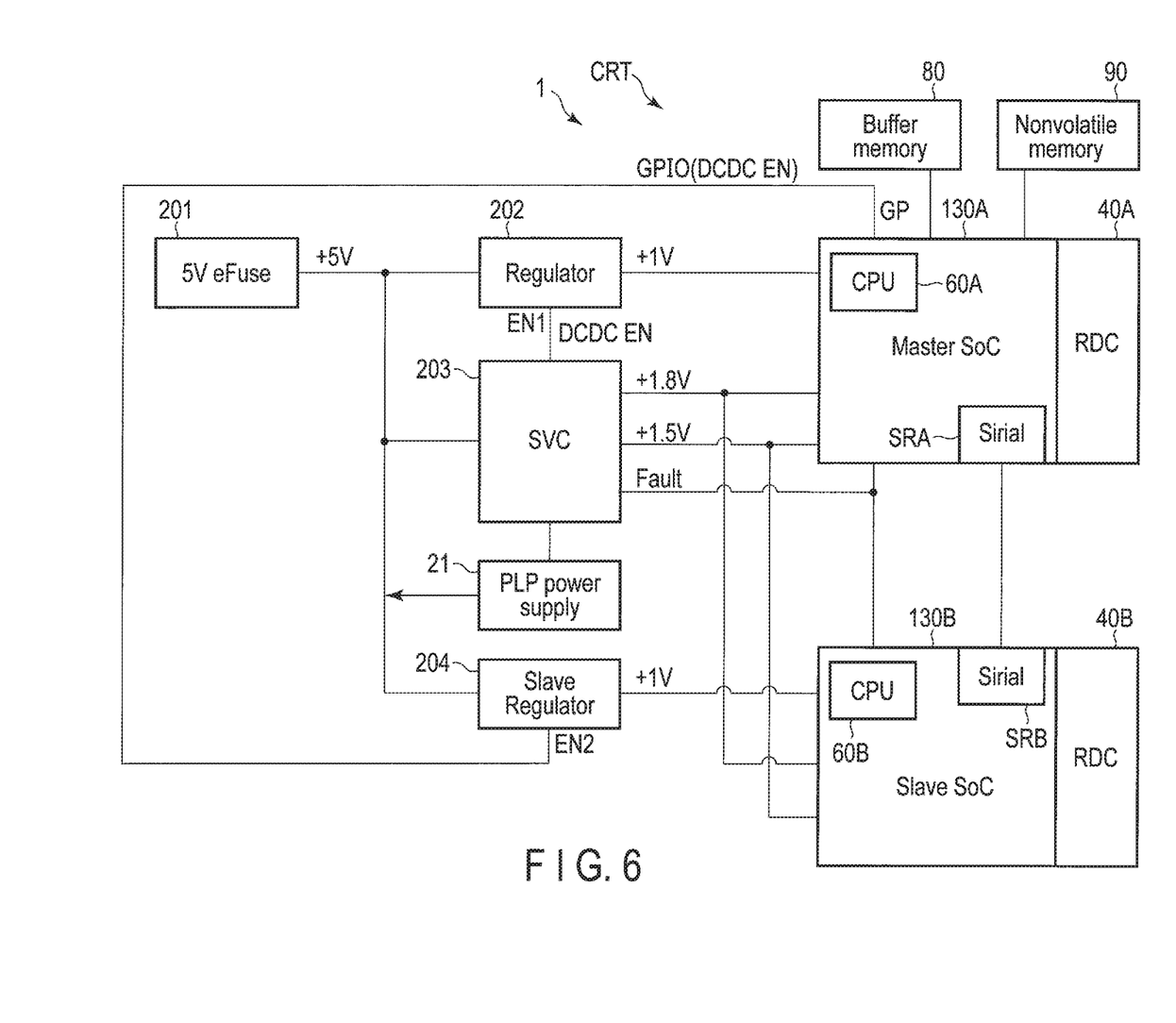
FIG. 6 is a block diagram showing an example of a PLP circuit according to a third embodiment.

FIG. 6 is a block diagram showing an example of the PLP circuit according to the third embodiment.

An SVC 203 is electrically connected to a PLP power supply 21, a power supply 201, the DCDC enable pin EN1 of a regulator 202, a system controller 130A and a system controller 130B.

When a signal for stopping the operation (in other words, a disable signal) is received from the system controller 130A via a general purpose input/output (GPIO) pin GP (or a DCDC enable pin) as described later, the operation of the regulator 204 is stopped (in other words, the regulator 204 is disabled).

The system controller 130A comprises the GPIO pin GP. The system controller 130A is connected to the enable pin EN2 of a regulator 204 via the GPIO pin GP. In other words, the GPIO pin GP of the system controller 130A is electrically connected to the enable pin EN2 of the regulator 204. When the shutoff of or reduction in power from the power supply 201 is detected, for example, when a fault signal is received from the SVC 203, the system controller 130A receives minimum information necessary to prevent an communication error from the system controller 130B via a serial interface SRA. After receiving minimum information in the serial interface SRA from the serial interface SRB of the system controller 130B, the system controller 130A outputs a disable signal to the enable pin EN2 of the regulator 204 via the GPIO pin GP.

When the shutoff of or reduction in power from the power supply 201 is detected, for example, when a fault signal is received from the SVC 203, the system controller 130B outputs minimum necessary information to the serial interface SRA of the system controller 130A via the serial interface SRB.

Figure 7:
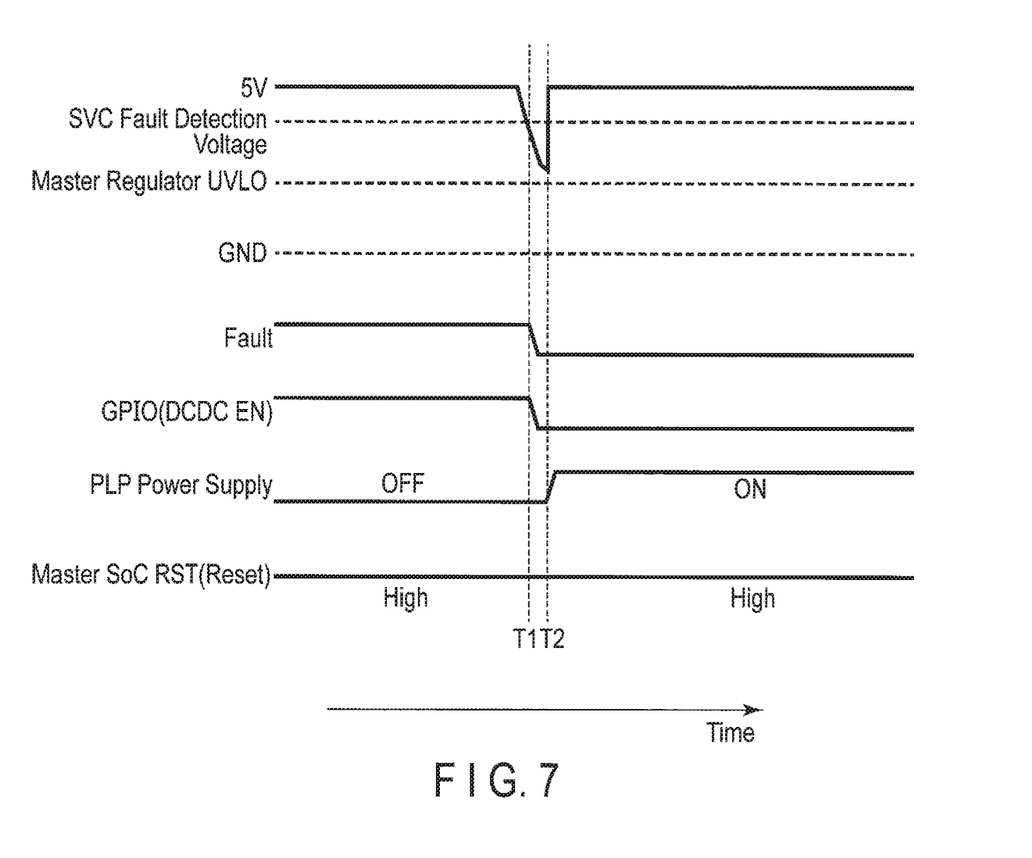
FIG. 7 is a timing chart showing an example of the PLP process of the PLP circuit shown in FIG. 6.

FIG. 7 is a timing chart showing an example of the PLP process of the PLP circuit CRT shown in FIG. 6. In FIG. 7, the horizontal axis represents time. In FIG. 7, the arrow shows the passage of time. FIG. 7 shows a disable signal from the GPIO pin GP of the system controller 130A.

In the examples shown in FIG. 6 and FIG. 7, when the shutoff of or reduction in power from the power supply 201 is detected at timing T1, the SVC 203 outputs a fault signal to the system controller 130A and the system controller 130B. When a fault signal is received from the SVC 203 at timing T1, the system controller 130B outputs minimum necessary information to the serial interface SRA of the system controller 130A via the serial interface SRB. When a fault signal is received from the SVC 203 at timing T1, and further when minimum necessary information is received in the serial interface SRA from the serial interface SRB of the system controller 130B, the system controller 130A outputs a disable signal to the enable pin EN2 of the regulator 204 via the GPIO pin GP. When a disable signal is received in the enable pin EN2 from the GPIO pin GP of the system controller 130A, the operation of the regulator 204 is stopped. As power is not supplied from the regulator 204, the operation of the system controller 130B is stopped. When the shutoff of or reduction in power from the power supply 201 is detected, the SVC 203 outputs an activation signal to the PLP power supply. When an activation signal is received from the SVC 203, the PLP power supply 21 is activated at timing T2. The PLP power supply 21 supplies power to the regulator 202 to maintain the operation of the system controller 130A. It is possible to prevent the interruption of a PLP process by activating the PLP power supply 21 at timing T2 before the voltage of the regulator 202 reaches the master regulator UVLO. In this way, before the UVLO of the regulator 202 operates, the PLP power supply 21 is activated, and further, the system controller 130B is stopped. Thus, the system controller 130A is configured to perform a backup process for storing, in a nonvolatile memory 90, the cache data temporarily stored in a buffer memory 80 without interrupting a PLP process.

According to the third embodiment, when the shutoff of or reduction in power from the power supply 201 is detected, the magnetic disk device 1 outputs necessary minimum information from the system controller 130B to the system controller 130A, outputs a disable signal from the GPIO pin GP of the system controller 130B to the enable pin EN2 of the regulator 204 and disables the regulator 204. When the regulator 204 is stopped, the operation of the system controller 130B is stopped. When the shutoff of or reduction in power from the power supply 201 is detected, the magnetic disk device 1 immediately reduces power consumption by stopping the operation of the system controller 130 and activates the PLP power supply. Thus, a PLP process can be performed by only the power consumption of the system controller 130A. In this way, when the power from the power supply 201 is shut off or reduced, power can be supplied to the regulator 202 before the voltage of the regulator 202 reaches the voltage at which the UVLO operates. This structure prevents the interruption of a PLP process. The reliability of the magnetic disk device 1 can be improved.

Fourth Embodiment

The magnetic disk device 1 of the fourth embodiment is different from the magnetic disk device 1 of each of the above embodiments in terms of the structure of a PLP circuit CRT.

Figure 8:
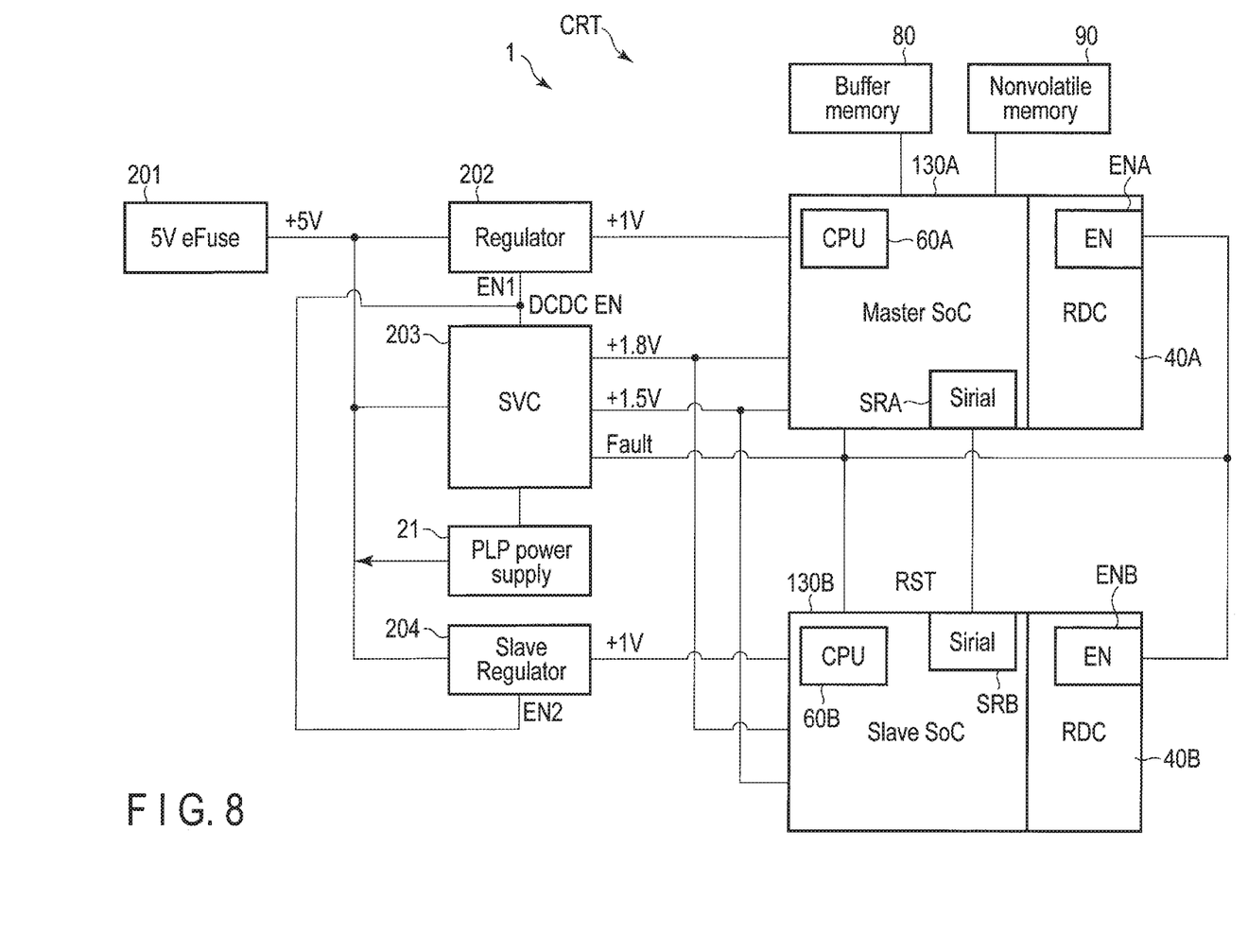
FIG. 8 is a block diagram showing an example of a PLP circuit according to a fourth embodiment.

FIG. 8 is a block diagram showing an example of the PLP circuit CRT according to the fourth embodiment.

An SVC 203 is electrically connected to a PLP power supply 21, a power supply 201, a DCDC enable pin EN1 provided in a regulator 202, a regulator 204, a system controller 130A, a system controller 130B, an enable pin ENA provided in an R/W channel 40A as described later, and an enable pin ENB provided in an R/W channel 40B as described later.

The system controller 130A comprises the R/W channel 40A comprising the enable pin ENA, a CPU 60A and a serial interface SRA. The system controller 130A is electrically connected to a buffer memory 80 and a nonvolatile memory 90.

The enable pin ENA of the R/W channel 40A is electrically connected to the SVC 203. The R/W channel 40A consumes more electricity than, for example, another unit of the system controller 130A. For example, the R/W channel 40A consumes the most electricity among the units of the system controller 130A. When the shutoff of or reduction in power from the power supply 201 of the system controller 130A is detected, for example, when a fault signal is received in the enable pin ENA of the R/W channel 40A from the SVC 203, the operation of the R/W channel 40A is stopped.

The system controller 130B comprises the R/W channel 40B comprising the enable pin ENB, a CPU 60B and a serial interface SRB. The enable pin ENB of the R/W channel 40B is electrically connected to the SVC 203. The R/W channel 40B consumes more electricity than, for example, another unit of the system controller 130B. For example, the R/W channel 40B consumes the most electricity among the units of the system controller 130B. When the shutoff of or reduction in power from the power supply 201 is detected, for example, when a fault signal is received in the enable pin ENB of the R/W channel 40B from the SVC 203, the operation of the R/W channel 40B is stopped.

Figure 9:
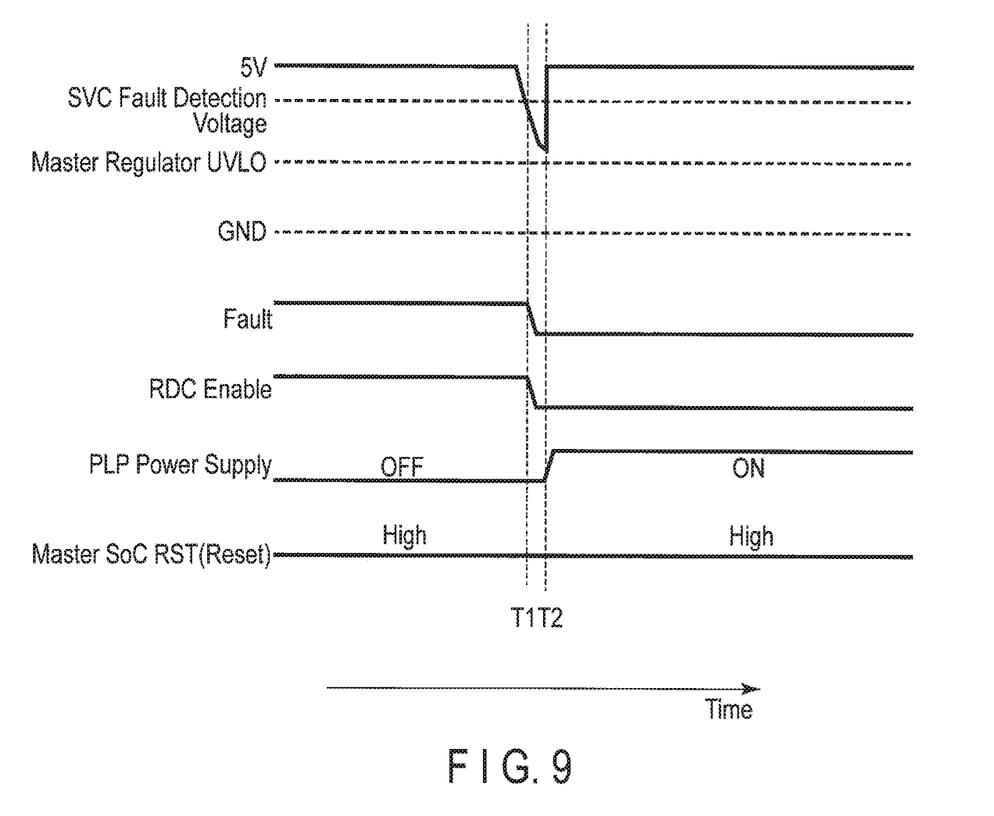
FIG. 9 is a timing chart showing an example of the PLP process of the PLP circuit shown in FIG. 8.

FIG. 9 is a timing chart showing an example of the PLP process of the PLP circuit CRT shown in FIG. 8. In FIG. 9, the horizontal axis represents time. In FIG. 9, the arrow shows the passage of time. FIG. 9 shows the enable of the R/W channels 40A and 40B.

In the examples shown in FIG. 8 and FIG. 9, when the shutoff of or reduction in power from the power supply 201 is detected at timing T1, the SVC 203 outputs a fault signal to the enable pin ENA of the R/W channel 40A, the enable pin ENB of the R/W channel 40B, the system controller 130A and the system controller 130B. When the shutoff of or reduction in power from the power supply 201 is detected at timing T1, the SVC 203 outputs a regulator enable signal to the regulator 204. When a fault signal is received from the SVC 203 in the enable pin ENA at timing T1, the operation of the R/W channel 40A is stopped. When a fault signal is received from the SVC 203 in the enable pin ENB at timing T1, the operation of the R/W channel 40B is stopped. When the shutoff of or reduction in power from the power supply 201 is detected at timing T1, the SVC 203 outputs an activation signal to the PLP power supply. When an activation signal is received from the SVC 203, the PLP power supply 21 is activated at timing T2. The PLP power supply 21 supplies power to the regulator 202 to maintain the operation of the units of the system controller 130A other than the R/W channel 40A. The PLP power supply 21 supplies power to the regulator 204 to maintain the operation of the units of the controller 130B other than the R/W channel 40B. It is possible to prevent the interruption of a PLP process by activating the PLP power supply 21 at timing T2 before voltage reaches the master regulator UVLO. In this way, before the UVLO of the regulator 202 operates, the PLP power supply 21 is activated, and the R/W channel 40A of the system controller 130A is stopped, and further, the R/W channel 40B of the system controller 130B is stopped. Thus, the system controller 130A is configured to store, in a nonvolatile memory 90, the cache data temporarily stored in a buffer memory 80 without interrupting a PLP process. The PLP power supply 21 may be configured to supply power to only the regulator 202 when an activation signal is received.

According to the fourth embodiment, when the shutoff of or reduction in power from the power supply 201 is detected, the magnetic disk device 1 outputs a fault signal to the enable pin ENA of the R/W channel 40A and the enable pin ENB of the R/W channel 40B and stops the operation of the R/W channels 40A and 40B. When the shutoff of or reduction in power from the power supply 201 is detected, the magnetic disk device 1 immediately reduces power consumption by stopping the operation of the R/W channel 40A of the system controller 130A and the R/W channel 40B of the system controller 130B and activates the PLP power supply. Thus, a PLP process can be performed by the power consumption of the units of the system controller 130A other than the R/W channel 40A and the units of the system controller 130B other than the R/W channel 40B. In this way, when the power from the power supply 201 is shut off or reduced, power can be supplied to the regulators 202 and 204 before the voltage of the regulators 202 and 204 reaches the voltage at which the UVLO operates. This structure prevents the interruption of a PLP process. The reliability of the magnetic disk device 1 can be improved.

Fifth Embodiment

The structure of the magnetic disk device 1 of the fifth embodiment is different from that of the magnetic disk device 1 of each of the above embodiments.

Figure 10:
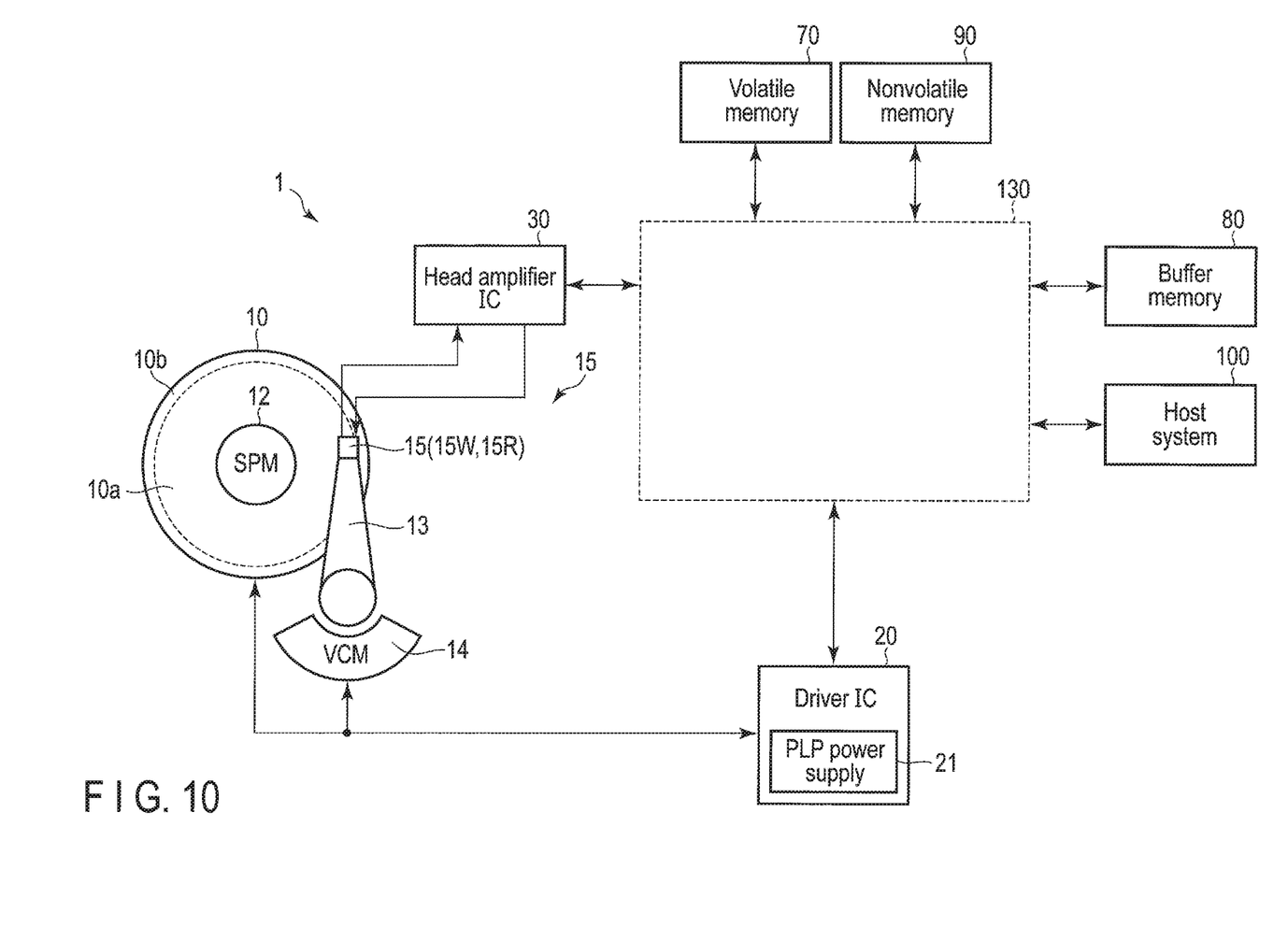
FIG. 10 is a block diagram showing the structure of a magnetic disk device according to a fifth embodiment.

FIG. 10 is a block diagram showing the structure of the magnetic disk device 1 according to the fifth embodiment.

The magnetic disk device 1 comprises a disk 10, an SPM 12, an arm 13 comprising a head 15, a VCM 14, a driver IC 20, a head amplifier IC 30, a volatile memory 70, a buffer memory (buffer) 80, a nonvolatile memory 90 and a system controller 130 which is a single-chip integrated circuit. The magnetic disk device 1 is connected to a host 100. The magnetic disk device 1 of the fifth embodiment is a normal magnetic disk device comprising a single actuator 16.

Figure 11:
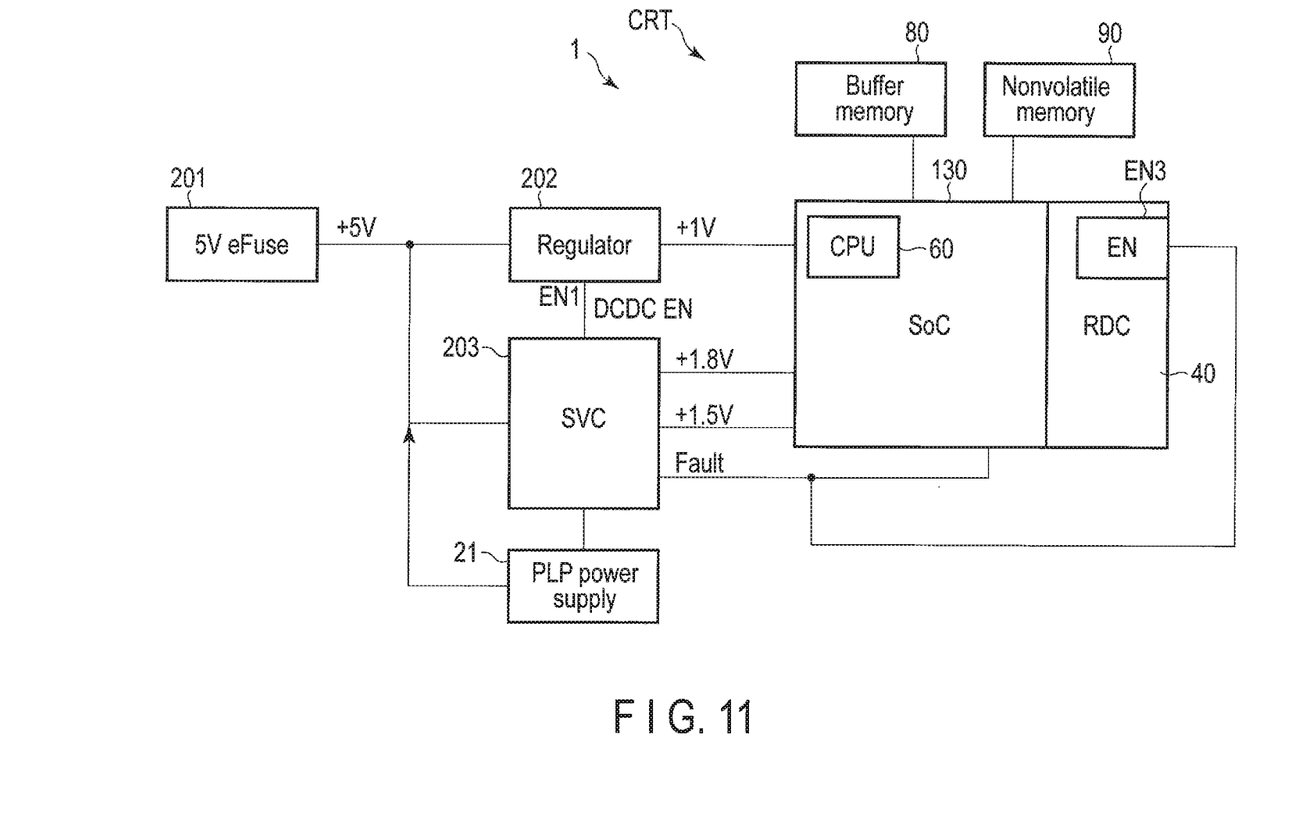
FIG. 11 is a block diagram showing an example of a PLP circuit according to the fifth embodiment.

FIG. 11 is a block diagram showing an example of a PLP circuit CRT according to the fifth embodiment.

The PLP circuit CRT is a circuit for performing a PLP process. The PLP circuit CRT comprises, for example, a PLP power supply 21, the buffer memory 80, the nonvolatile memory 90, the system controller 130, a power supply 201, a regulator 202 and a servo component (SVC) 203. The PLP circuit CRT may further comprise the volatile memory 70.

The power supply 201 is electrically connected to the regulator 202 and the SVC 203. The power supply 201 supplies electricity (power) to the regulator 202 and the SVC 203. For example, the power supply 201 supplies a power of 5 V to each of the regulator 202 and the SVC 203.

The regulator 202 is electrically connected to the system controller 130. The regulator 202 outputs a particular voltage or current to the system controller 130. For example, the regulator 202 outputs 1 V to the system controller 130.

The SVC 203 is electrically connected to the PLP power supply 21, the power supply 201, the DCDC enable pin EN1 of the regulator 202, the system controller 130 and the enable pin EN3 of the R/W channel 40 of the system controller 130 as described later. For example, the SVC 203 outputs 1.8 V and 1.5 V to the system controller 130. When the shutoff of or reduction in power from the power supply 201 is detected, for example, the SVC 203 outputs a fault signal to the system controller 130 and the enable pin EN3 of the R/W channel 40 of the system controller 130. When the shutoff of or reduction in power from the power supply 201 is detected, the SVC 203 outputs an activation signal to the PLP power supply.

The PLP power supply 21 is electrically connected to the regulator 202 and the SVC 203. When an activation signal is received from the SVC 203, the PLP power supply 21 is activated and supplies power to at least the regulator 202.

The buffer memory 80 is connected to the system controller 130. The nonvolatile memory 90 is connected to the system controller 130.

The system controller 130 comprises the R/W channel 40 and a CPU 60. The system controller 130 is electrically connected to the buffer memory 80 and the nonvolatile memory 90. When the shutoff of or reduction in power from the power supply 201 is detected, for example, when a fault signal is received from the SVC 203, the system controller 130 performs a backup process for saving the cache data stored in the buffer memory to the nonvolatile memory 90.

The R/W channel 40 performs a signal process of read data transferred from the disk 10 to the host 100 and write data transferred from the host 100 in response to an instruction from the CPU 60 as described later. The R/W channel 40 comprises a circuit or function for evaluating the signal quality of read data. The R/W channel 40 comprises an enable pin EN3. When a fault signal is input to the enable pin EN3 from the SVC 203, the operation of the R/W channel 40 is stopped (in other words, the R/W channel 40 is off).

The CPU 60 is a main controller which controls the units of the magnetic disk device 1 in response to an instruction from the host 100, etc. The CPU 60 performs servo control by controlling the actuator via the driver IC 20 to determine the position of the head 15. The CPU 60 controls data write to the disk 10 and selects the storage destination of write data. The CPU 60 controls data read from the disk 10 and controls the process of read data. The CPU 60 is connected to the units of the magnetic disk device 1. The CPU 60 is electrically connected to, for example, the driver IC 20 and the R/W channel 40.

In the example shown in FIG. 11, when the shutoff of or reduction in power from the power supply 201 is detected, the SVC 203 outputs a fault signal to the system controller 130 and the enable pin EN3 of the R/W channel 40. When a fault signal is received in the enable pin EN3 from the SVC 203, the operation of the R/W channel 40 is stopped. When the shutoff of or reduction in power from the power supply 201 is detected, the SVC 203 outputs an activation signal to the PLP power supply. When an activation signal is received from the SVC 203, the PLP power supply 21 is activated. The PLP power supply 21 supplies power to the regulator 202 to maintain the operation of the system controller 130. As the PLP power supply 21 is activated after the operation of the R/W channel 40 is stopped, the system controller 130 is configured to reduce the necessary power consumption and perform a backup process for storing, in the nonvolatile memory 90, the cache data temporarily stored in the buffer memory 80.

According to the fifth embodiment, when the shutoff of or reduction in power from the power supply 201 is detected, the magnetic disk device 1 outputs a fault signal to the system controller 130 and the enable pin EN3 of the R/W channel 40 and stops the operation of the R/W channel 40. When the shutoff of or reduction in power from the power supply 201 is detected, the magnetic disk device 1 immediately reduces power consumption by stopping the operation of the R/W channel 40 of the system controller 130 and activates the PLP power supply. Thus, a PLP process can be performed by the power consumption of the units of the system controller 130 other than the R/W channel 40. In this way, the magnetic disk device 1 is configured to perform a PLP process with less energy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   first and second heads which write data to the disk and read data from the disk;
   a first actuator comprising the first head;
   a second actuator comprising the second head;
   first and second controllers which control the first head, the second head, the first actuator and the second actuator;
   an auxiliary power supply which supplies power when power from a power supply is shut off; and
   a power supply detection unit which makes power supplied from the auxiliary power supply to the first controller higher than the power supplied from the auxiliary power supply to the second controller when shutoff of power from the power supply is detected;
   wherein the power supplied from the auxiliary power supply to one of the first and second controllers is reduced immediately after the power from the power supply is shut off.

2. The magnetic disk device of claim 1, further comprising:
   a first power supply unit which is electrically connected to the power supply, the auxiliary power supply and the first controller, and supplies power to the first controller; and
   a second power supply unit which is electrically connected to the power supply, the auxiliary power supply and the second controller, and supplies power to the second controller, wherein
   the power supply detection unit stops the second power supply unit when shutoff of power from the power supply is detected.

3. The magnetic disk device of claim 2, wherein
   the second power supply unit comprises an enable pin, wherein
   the power supply detection unit is electrically connected to the enable pin, and outputs a fault signal to the enable pin when shutoff of power from the power supply is detected.

4. The magnetic disk device of claim 3, wherein
   the auxiliary power supply supplies power to the first power supply unit before a first voltage at which a low-voltage abnormal operation prevention function operates is reached.

5. The magnetic disk device of claim 1, further comprising:
   a first power supply unit which is electrically connected to the power supply, the auxiliary power supply and the first controller, and supplies power to the first controller; and
   a second power supply unit which is electrically connected to the power supply, the auxiliary power supply and the second controller, and supplies power to the second controller, wherein
   the first controller stops the second power supply unit when power from the power supply is shut off.

6. The magnetic disk device of claim 5, wherein
   the second power supply unit comprises an enable pin,
   the power supply detection unit outputs a fault signal to the first controller when shutoff of power from the power supply is detected, and
   the first controller comprises a GPIO pin, is electrically connected to the enable pin via the GPIO pin, and outputs a signal to the enable pin via the GPIO pin when the fault signal is received from the power supply detection unit.

7. The magnetic disk device of claim 1, wherein
   the power supply detection unit stops the second controller when shutoff of power from the power supply is detected.

8. The magnetic disk device of claim 7, wherein
   the second controller comprises a reset pin, and
   the power supply detection unit is electrically connected to the reset pin, and outputs a fault signal to the reset pin when shutoff of power from the power supply is detected.

9. The magnetic disk device of claim 1, wherein
   the first controller comprises a first read/write channel,
   the second controller comprises a second read/write channel, and
   the power supply detection unit stops the first read/write channel and the second read/write channel when shutoff of power from the power supply is detected.

10. The magnetic disk device of claim 9, wherein
    the first read/write channel comprises a first enable pin;
    the second read/write channel comprises a second enable pin; and
    the power supply detection unit outputs a fault signal to the first enable pin and the second enable pin when shutoff of power from the power supply is detected.

11. The magnetic disk device of claim 2, further comprising:
    a volatile memory electrically connected to the first controller; and
    a nonvolatile memory electrically connected to the first controller.

* * * * *